United States Patent [19]
Gerber

[11] Patent Number: 5,103,443
[45] Date of Patent: Apr. 7, 1992

[54] OPTICAL RECORDING MEDIUM WITH HIGH ABSORPTION AND HIGH REFLECTIVITY

[76] Inventor: Arthur M. Gerber, 350 Thames Dr., Colorado Springs, Colo. 80906

[21] Appl. No.: 577,013

[22] Filed: Sep. 4, 1990

[51] Int. Cl.$^5$ .............................................. G11B 7/00
[52] U.S. Cl. .................................. 369/100; 369/283; 369/284; 369/288; 346/76 L; 346/135.1; 430/270; 430/945
[58] Field of Search ..................... 369/100, 116, 275.1, 369/272, 275.2, 275.4, 283, 284, 286, 288; 346/76 L, 135.1; 430/945, 270

[56] References Cited

U.S. PATENT DOCUMENTS

| | | | |
|---|---|---|---|
| 4,807,218 | 2/1989 | Gerber | 369/100 |
| 4,812,218 | 3/1989 | Gerber | 346/135.1 X |
| 4,983,440 | 1/1991 | Ikeda et al. | 369/288 X |

Primary Examiner—Robert L. Richardson
Attorney, Agent, or Firm—E. T. Barrett

[57] ABSTRACT

A thin film is formed on a plastic substrate that is preformed with recording tracks, either continuous or discontinuous, formed of a metal containing film on a thermoplastic substrate. Individually-identifiable recording elements arranged in rows are preferred. Initial reflection of the recording elements are reduced by etching or microscopically roughing the surface to produce discontinuities with dimensions less than one wavelength of the light being used to record on and read from the media. The rough surface may be created on the plastic before the application of the metallic film or the film itself may be roughened after application to the plastic. The resulting micromirrors can have about equal initial reflectivity and absorption of about fifty percent with little or no transmission. The location of the individual recording elements can be determined prior to recording and used as a gauge to permit compensation for changes in the scanning velocity of the reading or writing beam. One bit of digital information is recorded on each recording element either by leaving the reflectivity unchanged or by applying focused energy of sufficient intensity to melt or distort the plastic beneath the metal-containing film and thereby further decrease the reflectivity.

18 Claims, 1 Drawing Sheet

OPTICAL RECORDING MEDIUM WITH HIGH ABSORPTION AND HIGH REFLECTIVITY

BACKGROUND OF THE INVENTION

1. Field of the Invention

This invention relates to optical recording media in which digital data are recorded by a laser beam acting upon an absorptive surface to change the reflectivity. More particularly, it relates to a recording medium in which a metal film overlies a thermoplastic substrate and in which the film has increased absorption because of surface discontinuities in the substrate.

2. Description of Related Art

A number of earlier patents of the present inventor, such as U.S. Pat. No. 4,811,331, describe a recording medium formed of a thermoplastic substrate having an array of parallel rows of uniformly spaced microscopic individually-identifiable optically-alterable recording spots, called micromirrors. Each micromirror is capable of storing one bit of digital information. The surface of each micromirror is coated with a reflective material such as a composite of gold and silicon dioxide. To record data, a laser beam is focused successively on the micromirrors leaving each micromirror unchanged (to indicate, say, a digital zero) or with a detectably reduced reflectivity (to indicate, say, a digital one). If the reflectivity is to remain unchanged, the laser beam is adjusted to have enough intensity to identify the presence of the micromirror but insufficient energy to materially change the reflectivity of the micromirror. If the reflectivity of the micromirror is to be reduced, the intensity of the laser beam is increased so that a particular micromirror is destroyed to the extent that it has reduced reflectivity. The laser beam does not reduce the reflectivity of any of the micromirrors to zero, but allows enough reflectivity to remain that the presence of the micromirror is readily identified by the reading laser that distinguishes between micromirrors of different reflectivity.

Such discrete micromirrors serve as counting fixtures from which the position of the recording and reading beams can be continually determined. This is particularly important when the medium is used in a scanning system in which the scanning velocity of the laser beam is not constant. For example, when scanning an optical card along successive rows of micromirrors, the reading and writing mechanisms are much simplified if it is not necessary to maintain a constant scanning velocity during reading and writing. For example, at the end of each row of micromirrors, it is necessary to reverse the direction of the scan, either by reversing the direction of the beam or the movement of the optical card. One of the most efficient ways to do this is for the scanning beam to move, relative to the card, with a generally sinusoidal motion. This is a feasible alternative with the use of the uniformly spaced micromirrors.

The coating material used on such optical media must be applied as a uniform extremely thin layer and the formulation is critical. These factors add significantly to the cost of an optical recording card. Many metals or metallic compounds have the necessary stability for long term storage, but do not have the sufficient absorption for recording with low-cost diode lasers. It is desirable to use pre-formed recording elements, or at least a recording track, that must have sufficient reflection for detection of its position, but must absorb sufficient energy that a beam of moderate power can materially reduce the reflectivity of the film. For example, gold in a uniform thin film has the necessary stability and is readily detectable by a laser beam, but may have as much as 80% reflectivity and 15% transmission with only about 5% or less of the energy being absorbed by the film. Recording on such a film requires excessively high power to alter the reflectivity. If $SiO_2$ is combined in a gold film, the absorption is increased to about 20%. Such a film permits the use of an 8 milliwatt laser beam with a 300 nanosecond exposure. An exposure time of only 100 nanoseconds or less is much to be desired because of the potentially higher recording speed. A more or less ideal medium would have an absorption of about 50% and a reflectivity of about 50%, preferably with little or no transmission.

Tellurium and tellurium alloys have been widely used in optical recording media because of their low melting points, but have a history of serious problems because of their chemical instability and toxicity. Sealing the tellurium based recording layer between sheets of glass has been one approach to solving these problems but has drawbacks related to media cost and potential for breakage.

Craighead in U.S. Pat. No. 4,422,159 describes a medium formed of material such as germanium or silicon that is etched to produce a structure having a multiplicity of columnar or conical features spaced less than one wavelength apart. The resulting medium appears black because almost all of the light is internally reflected within the germanium or silicon columns and is not reflected back toward the source. The Craighead medium has high absorption and substantially no reflectivity. After treatment with a laser beam the medium exhibits increased reflectivity where the surface has been melted to reshape the columns into a smooth reflective surface. Such a medium permits high recording sensitivity because of the absorption of almost all of the light but does not permit the identification of recording tracks prior to recording. Because recording requires melting the inorganic crystallites comprising the film, a high temperature is required to melt the crystallites and change the reflectivity of the film. The medium described in the Craighead patent cannot tolerate a nonuniform scanning speed.

SUMMARY OF THE INVENTION

A thin metal film is formed on a thermoplastic substrate with microscopic surface discontinuities. The metal film thickness and the discontinuities are adjusted to produce an optical recording medium with almost no transmission and approximately equal reflectivity and absorption. It is generally accepted that if a normally reflective film does not have a flat uninterrupted surface extending for as much as a wavelength of the light being used to act on the film, the film will not reflect the light and will appear black. If a diode laser is being used with a wavelength of the order of 0.8 micron, then a flat surface extending at least 0.8 micron is necessary for reflection. The discontinuity can be represented by any significant geometrical change in surface direction that prevents about one-half of the light from being reflected and causes that half to be absorbed.

The absorption can occur by many multiple internal reflections between the discontinuities, each reflection absorbing a small fraction of the light. With optimum relationships among the geometry of the discontinuities, the reflectivity, absorption coefficient, and thickness of the metal film coated on the discontinuities, the sum of the internal reflections results in absorption of about one-half of the incident light. The term "discontinuities" as used here means geometric deviations from a smooth surface such as depressions and prominences, including honeycombs and spikes, that are of sufficient dimensions to interact with light.

Throughout this discussion and in the claims, references to absorption, transmission and reflection relate to the wavelength of the particular laser beam being used to write on or read from the optical medium.

In most optical recording media, data is recorded by either increasing or decreasing the reflectivity of the medium by melting or evaporating the metal recording film. When using metals with high melting points, adequate recording speed can be attained only with the use of a high power laser beam. Tellurium alloys have low melting points but have other disadvantages as mentioned above.

In the medium described here, the absorption of the metal film is increased by microscopic roughing of the surface and, in addition, the power requirements are further reduced because the writing mechanism is by deformation of the plastic substrate, not by melting or evaporating the recording film. Much less energy is required than would be necessary for melting or evaporating a metal film which generally has a much higher melting point than the plastic substrate.

It is desirable that the medium have recording tracks that can be identified prior to recording to provide directional guidance for the writing and reading beams. These tracks may be continuous, but there are advantages in forming the tracks of separate spaced recording elements that can also serve as counting elements to accommodate non-constant scanning velocities. A preferred embodiment uses a uniform array of spaced microscopic mesas extending from the thermoplastic surface. The surfaces of these mesas or micromirrors are coated with a reflecting metal such as aluminum, nickel, chromium, silver, palladium, gold, etc. to a depth that essentially eliminates all transmission.

By the use of the micromirror construction, the location of the individual micromirrors can be determined prior to recording and used as a gauge to permit variations in the scanning speed of the reading or writing beam. One bit of digital information is recorded on each micromirror either by leaving the reflectivity unchanged or by applying focused energy of sufficient intensity to melt or distort the underlying thermoplastic substrate and thereby decrease the reflectivity.

DESCRIPTION OF THE PREFERRED EMBODIMENTS

Figure 2:
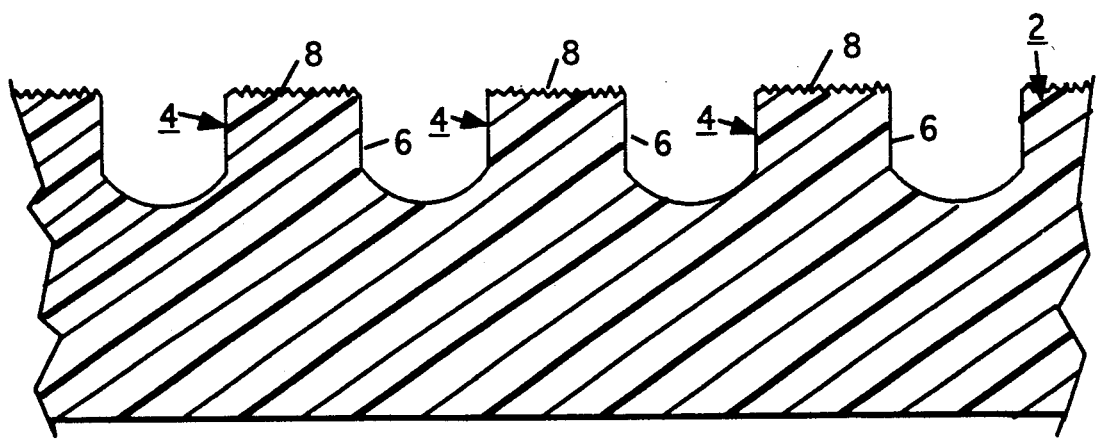
FIG. 2 is an enlarged partial cross-section along line 2—2 of FIG. 1.
Figure 1:
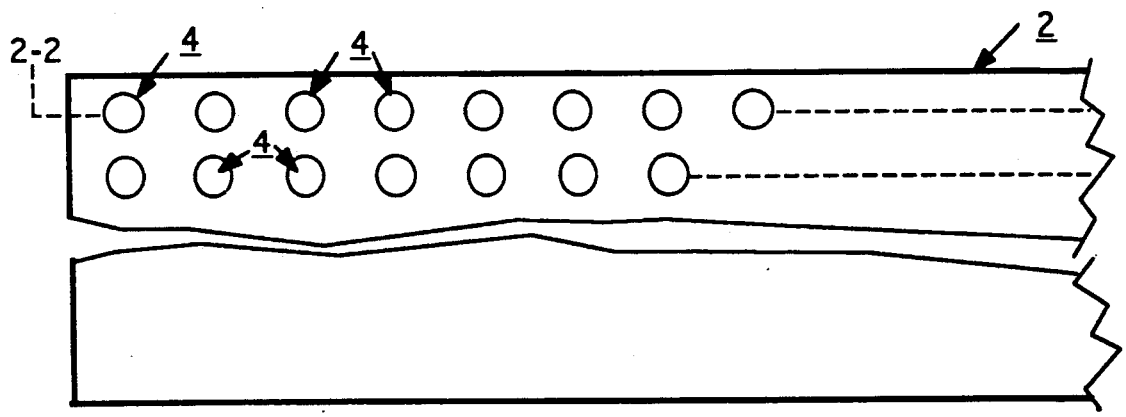
FIG. 1 is a diagrammatic partial top view illustrating an optical recording card having an array of parallel rows of micromirrors.

As shown in FIGS. 1 and 2, a plastic substrate 2 is formed with an array of micromirrors 4, each supported above the surface of the substrate by a mesa 6. The mesas that support the micromirrors are uniformly spaced in rows and the rows are separated by the same distance as that between adjacent mesas within each row. The center-to-center distance between adjacent micromirrors is about 2 microns, and the diameter of each mesa, that is the recording element is preferably between 0.8 and 1.2 microns. The upper surface of each mesa is coated with a reflecting material such as aluminum of sufficient thickness that its transmission of the laser beam is substantially zero. This coating may be confined to the upper surfaces of the mesas or it may extend over the entire surface of the substrate 2. The outer surface of each mesa is roughened, as diagrammatically indicated at 8, with surface discontinuities that are produced to reflect about one-half of the light, in this example, at a wavelength of 0.8 microns, and absorb the remainder, with little or no transmission.

A smooth metal surface of silver has a reflectivity of 80% or more, but when the metal is in a finely divided state, such as precipitated silver, the surface appears black because of the finely divided state of the metal. The light is reflected mostly into the open spaces between the particles, with a partial absorption at each reflection. The ideal arrangement of particles for this effect would be an array of needle-shaped highly-absorbing particles all extending perpendicularly to the surface. This theory is discussed by George S. Monk in Light Principles and Experiments, Page 275, Section 15-6, Dover Publications, Inc. For this particular application, total absorption is undesirable because it would prevent identification of the micromirrors before recording.

To reduce the reflectivity and decrease the energy required for recording, the surface of the film is roughed, by etching or any other means, to reduce the reflectivity to between about 40% and 60%, that is, about one-half of the energy of the beam is absorbed by the film. The thickness of the film may have to be increased to prevent loss of light by transmission. To record data, say a digital one, the laser beam is permitted to act on the recording element long enough to melt or distort the underlying thermoplastic substrate at that point and reduce the reflectivity to about 25%. The critical limits are: enough reflection to permit identification of the recording elements prior to recording and a detectable reduction in reflectivity after recording.

The rough surface may be created by treating either the plastic substrate before coating it with the metal or by treating the metal surface after the coating has been applied. For convenience it may be preferred, however, to apply the smooth metal film to the plastic substrate and then by means of a die under heat and pressure emboss the mesas and the surface discontinuities into the substrate leaving a coating of the metal film with the discontinuities on the surfaces of the mesas. The metal film must be of sufficient thickness to maintain a continuous surface on the mesas after the embossing process. Methods of creating such a mesa pattern are described more fully in applicant's U.S. Pat. No. 4,811,331. The die that forms the mesas may be subjected to etching by acid or alkali to form a roughened surface on each mesa.

To form the rough surface on the plastic substrate prior to formation of the mesas, the plastic, which for example may be a polycarbonate, polyvinyl chloride, or polyester, is exposed to microscopic droplets of solvent that are allowed to fall on the surface of the embossed plastic substrate. The solvent solution must include at least one active element that will attack the particular plastic. It is preferred in most instances to use a mixture of at least two solvents, one of which is inert and one of which is active, for example, isopropanol and methyl ethyl ketone.

The microscopic droplets may be formed by creating a dense vapor of the solvent or solvents and then rapidly chilling the vapor to cause the solvent to condense into microscopic droplets and fall upon the surface of the plastic substrate. It is preferred, however, to use intense ultrasonic dispersion of the solvent solution, either alone or in conjunction with rapid cooling, to produce the droplets.

In another embodiment, a high power ultrasonic transducer is placed in a solvent bath. The plastic substrate is then passed over the solvent at a critical distance where the microscopic particles created by the ultrasonic dispersion forces are directed to the surface being etched. The bath preferably includes at least two solvents at least one of which is active. By controlling the ratio of the active to the inactive solvents, the etching of the plastic can be controlled. For example, if the reflectivity of the medium subsequently coated with a metal film falls much below 40% the proportion of the active solvent, for example methyl ethyl ketone, is too high, while if it is above about 60%, the proportion of active solvent is too low.

An alternative method of etching the plastic is to first apply a very thin coating of a shielding material, such as polyethylene or Teflon, that is not attacked by the solvent. This layer must be so thin that it does not form a continuous sheet but through surface tension action forms minute separate surface elements. The plastic substrate is then exposed to the solvent that etches the plastic in the areas not covered by the inactive plastic.

The formation of the etched surface in the plastic substrate prior to coating of the reflective metal has the advantage of allowing the metal to more effectively coat the hills and valleys created by the etching process. In this way the process of coating the metal can be adjusted to provide the desired balance between absorption and reflectivity, with the elimination of loss of light by transmission.

The process of forming surface discontinuities in the same step as the formation of the micromirrors has fewer steps in manufacturing the optical recording medium and is therefore less expensive to produce. The achievement of the desired reflectivity and absorption of the media produced in this way is more difficult, however, because the reflective layer thickness cannot be adjusted to fit the specific substrate surface geometry. For example, if the metal film is too thin, there will be substantial gaps in the embossed metal film layer, causing loss of light by transmission. If, on the other hand, the metal film is too thick it may crack or peel from the plastic substrate. Control of the metal layer thickness coated on the smooth plastic substrate prior to embossing must be accurately tuned to the particular embossing tool to achieve optimal performance of the optical recording medium.

Figure 3:
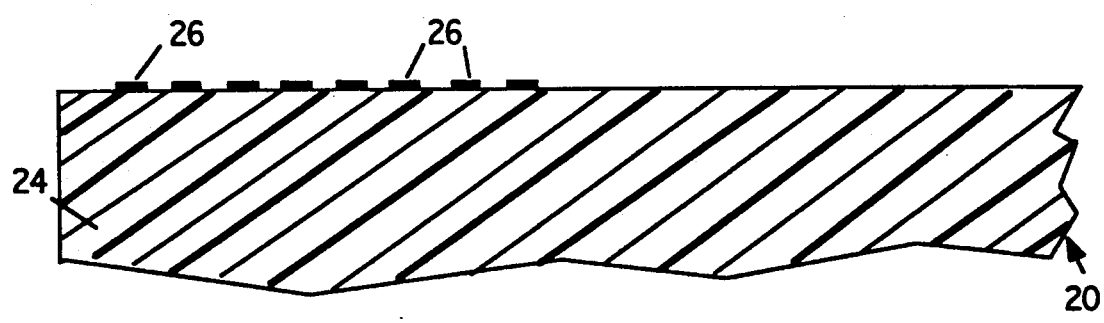
FIG. 3 is an enlarged sectional view of a recording medium without mesas.

FIG. 3 illustrates a storage medium, generally indicated at 20, having an overall flat but microscopically rough recording surface. 22 without any mesas above the general level of the substrate 24. Individual recording elements 26 are formed on the surface of the substrate 24. As before, each recording element is represented by a metal-containing film which has a microscopically roughened surface that reduces its reflectivity and increases its absorption, both to about 50%. In this instance, it is important that the spaces between the recording elements have a reflectivity significantly different from that of the recording elements so that each element can be individually identified both before and after recording. For example, the entire surface of the substrate can be coated with the metal film and then only the recording elements roughened to reduce the reflectivity. The metal surface might have a reflectivity of 80% as a smooth surface. The roughened recording elements have a reflectivity of about 50% and are thus readily identifiable before recording. During recording, selected elements are exposed to the laser beam of sufficient intensity to melt the thermoplastic substrate and thus further lower the reflectivity to about 25%. The recording elements, that is, the micromirrors, are then individually identifiable from the background and the recorded elements can be readily differentiated from those that remain in the pristine condition.

To form this medium, the plastic substrate may be roughened selectively at the recording elements by imprinting a die pattern on the substrate surface. The die has areas corresponding to recording elements that are roughened as previously described. The areas of the die between the recording elements are smooth. The thermoplastic substrate is subjected to the die under pressure at an elevated temperature. After the die operation is completed, the substrate is coated with the metal containing film. The areas between the recording elements preferably will have a significantly lower reflectivity than the recording elements.

Alternatively, the thermoplastic substrate can be coated with the metal-containing film and then subjected to the pressure of the die at an elevated temperature. The discontinuities of the die are impressed on the substrate at the recording elements to again produce an array of recording elements that can be individually identified both before and after recording.

In the recording process, the rows of micromirrors are scanned sequentially and individually identified by a laser beam of such low power that the micromirror remains unchanged in reflectivity. If the particular micromirror is to remain with its original reflectivity to record, say, a digital zero, the beam moves on to the next micromirror. If the reflectivity of that micromirror is to be decreased to indicate, say, a digital one, the intensity of the beam is increased to a level sufficient to melt, or partially melt, the plastic substrate to produce a reduction of at least a 20% in the reflectivity.

The length of time the higher intensity beam is allowed to remain on a single micromirror is just long enough to distort the substrate enough to produce the desired reduction in reflectivity, preferably to about 25%, but not long enough to melt or evaporate the metal film coating.

In reading the medium, a laser beam scans the rows of micromirrors sequentially as in recording and determines the recorded digital codes by differences in reflectivity. In both recording and reading, either the beam or the medium, in this example in the form of an optical card, must be reciprocated. Because of variation in the focal distance between the laser and the micromirrors by most conventional beam scanning systems, it may be preferable to move the card in a reciprocating pattern. However, instant reversal of the direction of the card at the end of each row of micromirrors is not possible, so that in any practical reader-writer there is always a variation in the scanning speed of the beam relative to the card. Advantage is taken of the ability to identify individual micromirrors both before and after recording to compensate for this speed variation. The beam scans and detects the presence of a micromirror. At that instant, the beam performs either its reading or writing function. That is, the reading and writing by the beam is controlled by the presence of the micromirror and not by the speed of the scanning.

What is claimed is:

1. The method of recording digital data comprising the steps of providing a thermoplastic substrate,
    coating said substrate with a metal-containing film having a microscopically roughened surface and defining predesignated recording tracks, said roughened surface producing in the unrecorded state an initial reflectivity and an initial absorption each of at least 40% and a transmission less than about 20%,
    scanning said tracks to record digital data thereon by means of a controlled laser beam having at the scanning speed a first intensity sufficient to detect said recording tracks but insufficient to melt said substrate or materially alter the reflectivity of said film and a second intensity sufficient to melt said substrate to reduce the reflectivity of said film by at least 20%.

2. The method as claimed in claim 1 wherein
    the initial reflectivity and absorption of said film in the unrecorded state are each about 50% with substantially no transmission.

3. The method as claimed in claim 2 wherein said substrate is polycarbonate.

4. The method as claimed in claim 1 wherein said film is formed predominantly of aluminum.

5. The method as claimed in claim 1 wherein
    said film contains at least one metal selected from the group comprising gold, silver, palladium, aluminum, nickel and chromium.

6. The method as claimed in claim 1 wherein
    said film has an absorption of said beam in its roughened and unrecorded state of about 50% and a transmission less than about five percent of the energy of said laser beam.

7. The method as claimed in claim 1 wherein
    said recording tracks are formed of an array of equally spaced recording elements arranged in parallel rows equally spaced apart.

8. The method as claimed in claim 7 wherein
    each of said elements is formed on an individual mesa raised above the surface of said substrate.

9. The method as claimed in claim 8 wherein
    each of said recording elements is between about 0.8 and 1.2 microns in maximum dimension.

10. The method as claimed in claim 1 wherein
    said substrate is a rectangular sheet.

11. The method as claimed in claim 1 including the step of
    roughing said film surface by exposing said substrate, prior to coating with said film, to a solvent solution containing an active solvent capable of etching said substrate.

12. The method as claimed in claim 11 including the step of
    immersing said substrate in a bath of said solvent solution, and
    subjecting said bath to intense ultrasonic dispersion forces.

13. The method as claimed in claim 11 wherein
    said solvent solution includes at least two solvents one of which is active and capable of etching said substrate and another inactive solvent incapable of etching said substrate.

14. The method as claimed in claim 13 wherein said active solvent is methyl ethyl ketone.

15. The method as claimed in claim 13 wherein
    said inactive solvent is isopropanol.

16. The method as claimed in claim 1 including the step of
    roughing said film by exposing said film after coating on said substrate to a solvent solution containing at least one active solvent capable of etching said film.

17. The method as claimed in claim 1 including the step of
    forming said roughened surface by subjecting said substrate under heat and pressure, after coating with said film, to a die having a microscopically roughened surface.

18. The method of recording digital information including the steps of
    providing a laser beam and a thermoplastic substrate,
    forming on said substrate an array of parallel rows of spaced individually-identifiable recording elements, each of said elements comprising a metal-containing film having a rough surface in which the discontinuities reduce the reflectivity to significantly less than the film would have with a smooth flat continuous surface while retaining an initial reflectivity of at least 40%, an initial absorption of at least 40%, and a transmission of no more than 20%,
    scanning said beam along said rows by relative movement between said substrate and said beam,
    causing said beam to scan successive rows and to reverse its relative direction at the end of each row, said scanning beam having a basic intensity insufficient at the speed of scanning to significantly alter the reflectivity of said elements,
    identifying the successive recording elements as intercepted by said beam, and
    recording one piece of digital information on each of said elements by either allowing the beam to remain at its basic intensity or increasing it sufficiently to melt said substrate at said element and thereby further significantly decrease its reflectivity.

* * * * *